Oct. 4, 1932.  V. G. APPLE  1,881,342
LAMP SOCKET MOTOR
Filed April 4, 1930
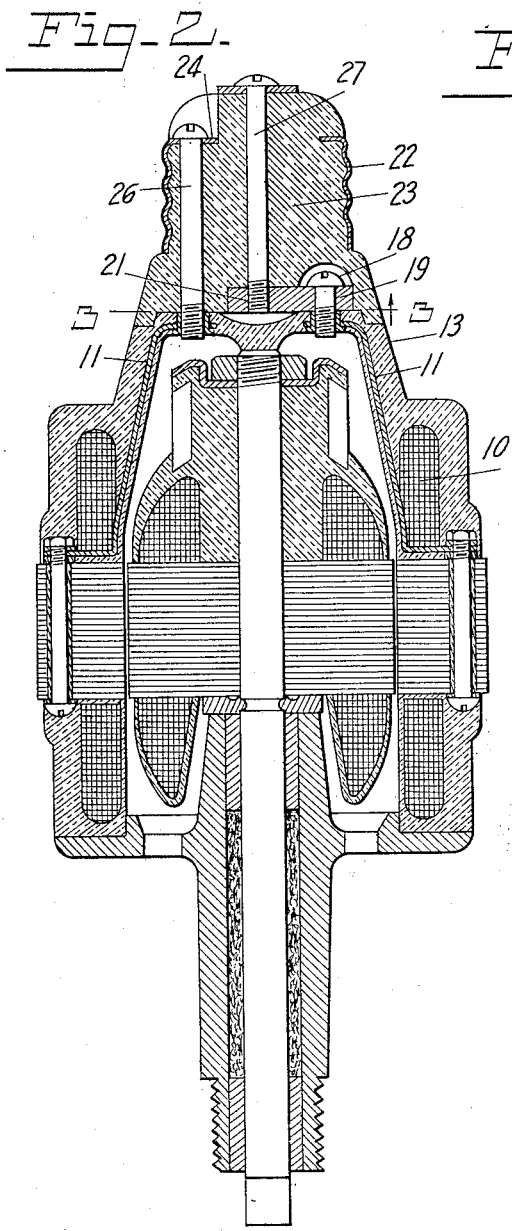
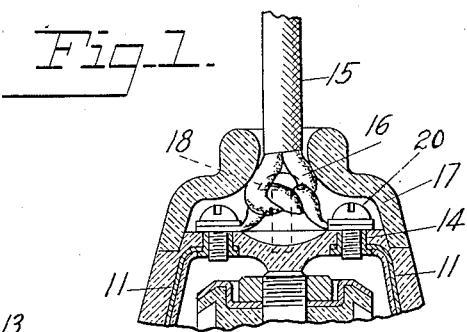
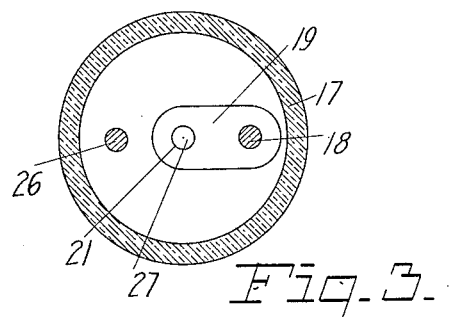
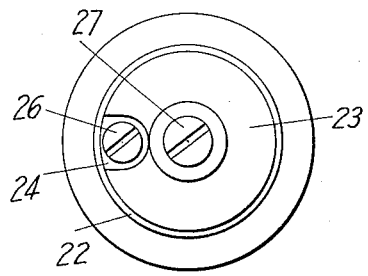
INVENTOR
Vincent G. Apple Patented Oct. 4, 1932

1,881,342

UNITED STATES PATENT OFFICE

VINCENT G. APPLE, OF DAYTON, OHIO

LAMP SOCKET MOTOR

Application filed April 4, 1930. Serial No. 441,667.

This invention relates to electric motors of relatively small size and particularly to that type wherein the rotor and stator elements each comprise a core of magnetic material, a winding, and a casing of molded insulation covering the winding and cementing it to the core.

The object of the invention is to provide improved facilities for supporting such a motor and for connecting to the source of current supply.

I attain this object in the structure hereinafter described reference being had to the drawing wherein—

Fig. 1 is a partial section intended to show how a motor of this type is ordinarily constructed when current is to be supplied to it from a two conductor cord.

Fig. 2 is a vertical axial section showing how the same motor may be adapted to receive not only its mechanical support but its electrical connection as well by screwing it into a lamp socket.

Fig. 3 is a section on the line 3—3 of Fig. 2 and Fig. 4 is a top plan view of the lamp socket connection.

Similar numerals refer to similar parts throughout the several views.

The motor shown in Figs. 1 and 2 is of that type shown and described as Fig. 25 in my copending application Serial No. 369,564, filed June 10th, 1929 wherein I show and claim a small motor having lamp cord connections as shown in Fig. 1 of the present application, and in which the windings and terminals are imbedded in a mass of molded insulation which at the same time forms the housing of the motor in the manner shown in Fig. 2 of the present application. In the present application I claim the specific motor structure therein shown and claimed in combination with a lamp socket adapter, and unique means of joining the motor and adapter together. The windings 10 and terminals 11 are buried in the wall 13 of the housing except at their upper ends where they are exposed and tapped as at 14.

In Fig. 1 a two conductor cord 15 has its end separated and knotted as at 16 and connected to the terminals 11 by screws 20. The cap 17 also of insulation comes down over knot 16 and is fastened in place by screws 18. Fig. 1 then shows the ordinary way of connecting these small motors to the electric circuit.

But there are instances where it is more convenient to connect a small motor of this type to the line by screwing it directly into a lamp socket, where for instance it is to be used to drive a flexible shaft at the end of which are small grinding wheels as in dental work, or small drills, as in tool work, and it is with a structure Fig. 2 wherein the motor Fig. 1 is adapted to such a purpose that the present invention is concerned.

To apply my improvement to the motor Fig. 1, I first remove the cap 17 by removing the screws 18 and the cord 15 by removing the screws 20. I then extend one of the motor terminals by placing a terminal extension 19 over the end of the housing and fastening it with one of the screws 18. A tapped hole 21 in terminal extension 19 then comes directly over the motor axis.

The lamp socket adapter comprises the usual lamp base ferrule 22 held, in this case, by a core 23 of insulation. The ferrule 22 has an ear 24 of the metal composing the ferrule turned inward, and a long screw 26 extends through an opening in this ear, through the core 23 and into the tapped end of one of the terminals 11 (see Fig. 2). A similar screw 27 extends through the center of core 23 and into the central tapped opening 21 of terminal extension 19. The screws 26 and 27 not only make the required electrical connections but mechanically secure the adapter to the motor.

The motor when combined with the adapter as shown in Fig. 2, requires only to be screwed into a lamp socket to be operated, and, by selecting a socket hung at a convenient height electrical connection and support for the motor will be provided at one and the same time.

Having described my invention,
I claim,

1. In combination with an electric motor having a winding, terminals for said winding, a mass of insulation covering said winding and said terminals and forming a housing for said motor, and rigid connecting ends on said terminals at the surface of said housing, lamp socket adapting means comprising a lamp base ferrule, a core of insulation within said ferrule, a screw extending through the center of said core into one of said connecting ends, and another screw offset from the center of said core, extending through said core into the other said connecting end, the first said screw having its head exposed to make contact with the center terminal of the lamp socket and the second said screw making electrical connection between said ferrule and said terminal.

2. An electric motor having means secured to its body adapting it to be screwed into a lamp socket for making electrical connection thereto, said motor comprising, a field core, a winding on said core, metal terminals for said winding secured to said core but electrically insulated therefrom, a mass of molded insulation surrounding and covering said winding and terminals and forming the housing of said motor, the ends of said terminals being brought to suitable positions on the outside of said housing, lamp socket adapting means comprising a lamp base ferrule, a core of insulation for said ferrule, a screw passing through the center of said core of insulation and electrically connecting to one said terminal, and another screw offset from the center of said core of insulation and electrically connecting to the other of said terminal.

3. An electric motor adapted to be screwed into a lamp socket for mechanical support of the motor and electrical connection to the line, said motor comprising a motor body, a magnetizable core, rigid insulated winding terminals on the outside of said motor, extending through said body and fastened to said core, a lamp base ferrule, a core of insulation for said ferrule, and two screws passing through said core into the said winding terminals, one securing said ferrule to one of said motor terminals and the other positioned to provide electrical connections between a lamp socket terminal and the other motor terminal when said motor is in the said lamp socket.

4. The combination, in an electric motor, of a hollow housing of insulation, a winding imbedded in the wall of said hollow housing, two rigid winding terminals each having a tapped opening, said terminals being connected to said winding and imbedded in the wall of said hollow housing, a rigid metal contact member in the form of a lamp base ferrule, a core of insulation within said ferrule, a second rigid metal contact member within said core, exposed at the center of the core at the end, and two screws securing the two rigid metal contact members to the two rigid winding terminals respectively, said screws constituting the sole means of electrically connecting the contact members to the winding terminals, and of mechanically connecting the said core to the said housing.

In testimony whereof I affix my signature.

VINCENT G. APPLE.